(12) United States Patent
Pfister et al.

(10) Patent No.: US 8,883,101 B2
(45) Date of Patent: Nov. 11, 2014

(54) METHOD FOR OPERATING AN EXHAUST GAS SYSTEM FOR AN INTERNAL COMBUSTION ENGINE

(71) Applicants: Tobias Pfister, Stuttgart (DE); Arthur Bastoreala, Remseck am Neckar (DE); Alexander Heinrich, Abstatt (DE)

(72) Inventors: Tobias Pfister, Stuttgart (DE); Arthur Bastoreala, Remseck am Neckar (DE); Alexander Heinrich, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/929,048

(22) Filed: Jun. 27, 2013

(65) Prior Publication Data
US 2014/0010745 A1   Jan. 9, 2014

(30) Foreign Application Priority Data
Jul. 5, 2012   (DE) .......................... 10 2012 211 717

(51) Int. Cl.
*B01D 53/94* (2006.01)
*F01N 3/10* (2006.01)
*F01N 3/18* (2006.01)
*F01N 3/20* (2006.01)

(52) U.S. Cl.
CPC ................................ *B01D 53/9495* (2013.01)
USPC .................. 423/213.2; 423/213.5; 423/213.7; 60/274; 60/286; 60/287; 60/299; 60/300; 60/303

(58) Field of Classification Search
CPC .. B01D 53/944; B01D 53/9477; F01N 3/103; F01N 3/105; F01N 3/2033; F01N 3/36
USPC ........... 423/213.2, 213.5, 213.7; 60/274, 286, 60/287, 299, 300, 303
See application file for complete search history.

(56) References Cited

U.S. PATENT DOCUMENTS

| | | | |
|---|---|---|---|
| 7,115,237 B2 * | 10/2006 | Sato et al. .................. | 423/213.2 |
| 7,533,524 B2 * | 5/2009 | Wang et al. ..................... | 60/297 |
| 2009/0188241 A1 * | 7/2009 | Sugiarto et al. ................. | 60/295 |
| 2009/0188243 A1 * | 7/2009 | Williams et al. ................ | 60/295 |
| 2011/0239623 A1 * | 10/2011 | Leustek et al. .................. | 60/274 |
| 2013/0152551 A1 * | 6/2013 | Kotnish ......................... | 60/274 |
| 2013/0160430 A1 * | 6/2013 | Singh et al. ..................... | 60/274 |
| 2013/0263577 A1 * | 10/2013 | Anilovich et al. .............. | 60/274 |

FOREIGN PATENT DOCUMENTS

| | | |
|---|---|---|
| DE | 10 2005 015 998 | 10/2006 |
| DE | 10 2009 046 433 | 5/2011 |

* cited by examiner

*Primary Examiner* — Timothy Vanoy
(74) *Attorney, Agent, or Firm* — Kenyon & Kenyon LLP

(57) ABSTRACT

A method for operating an exhaust gas system for an internal combustion engine, in which the exhaust gas system includes at least one first catalytic coating and at least one second catalytic coating, the second catalytic coating being situated in the exhaust gas flow downstream from the first catalytic coating. An additional quantity of hydrocarbons is occasionally introduced into the exhaust gas upstream from the first catalytic coating so that a heat-generating reaction may take place in the second catalytic coating. With the aid of at least one temperature sensor and/or at least one hydrocarbon sensor and/or at least one lambda sensor upstream and/or downstream from the second catalytic coating, at least one property of the exhaust gas is ascertained which characterizes a reaction of the second catalytic coating due to the additional quantity of hydrocarbons.

13 Claims, 4 Drawing Sheets

METHOD FOR OPERATING AN EXHAUST GAS SYSTEM FOR AN INTERNAL COMBUSTION ENGINE

RELATED APPLICATION INFORMATION

The present application claims priority to and the benefit of German patent application no. 10 2012 211 717.2, which was filed in Germany on Jul. 5, 2012, the disclosure of which is incorporated herein by reference.

FIELD OF THE INVENTION

The present invention relates to a method, and a control and/or regulation device and a computer program according to the descriptions herein.

BACKGROUND INFORMATION

Internal combustion engines are believed to be understood in which exhaust gas is improved, i.e., purified of pollutants, with the aid of an exhaust aftertreatment system. For example, an exhaust gas system for a diesel engine has a diesel oxidation catalytic converter, a diesel particle filter, and a selective catalytic reduction (SCR) catalytic converter in the flow direction of the exhaust gas. In addition, it is known to provide sensors in the exhaust gas system via which a composition of the exhaust gas may be optimally adjusted, or with the aid of which certain elements of the exhaust gas system may be monitored for proper operation.

One example of a patent publication in this field is DE 10 2009 046 433 A1.

SUMMARY OF THE INVENTION

An object upon which the present invention is based is achieved by a method according to the description herein, and by a control and/or regulation device and a computer program according to the further descriptions herein. Advantageous refinements are stated in the further descriptions herein.

Features which are important for the present invention are also found in the following description and in the drawings; the features may be important for the present invention alone as well as in various combinations without explicit reference being made thereto.

The present invention has the advantage that a second catalytic coating of an exhaust gas system, in particular in a diesel particle filter of an exhaust gas system of an internal combustion engine which operates according to the diesel principle, may be monitored particularly well without having to provide complicated auxiliary devices. In particular, the method may be used to easily deduce a state of the second catalytic coating or of the diesel particle filter with regard to the property of converting hydrocarbons. This may occur during operation of the internal combustion engine using sensors which are often already installed in the exhaust gas system.

The present invention relates to a method for operating the exhaust gas system for the internal combustion engine, the exhaust gas system including at least one first catalytic coating and at least one second catalytic coating, the second catalytic coating being situated in the exhaust gas flow downstream from the first catalytic coating. According to the present invention, an additional quantity of hydrocarbons is occasionally introduced into the exhaust gas upstream from the first catalytic coating in such a way that a heat-generating reaction may take place in the second catalytic coating. With the aid of at least one temperature sensor and/or at least one hydrocarbon sensor and/or at least one lambda sensor upstream and/or downstream from the second catalytic coating, at least one property of the exhaust gas is ascertained which characterizes a reaction of the second catalytic coating due to the additional quantity of hydrocarbons.

The second catalytic coating has the capability, among other things, of oxidizing uncombusted hydrocarbons and providing a defined ratio of NO to NO2 (nitrogen oxides) in the exhaust gas, so that a reduction of the nitrogen oxides (NOx) may proceed in an optimal manner in a selective catalytic reduction (SCR) catalytic converter situated downstream. These capabilities may be monitored particularly easily and accurately with the aid of the method according to the present invention. For a functioning second catalytic coating in the exhaust gas system, during the conversion of the hydrocarbons a quantity of heat is generated which is ascertained by the method. For this purpose, in one particular embodiment of the present invention at least one temperature sensor and/or at least one hydrocarbon sensor and/or at least one lambda sensor is/are used. These sensors are situated upstream and/or downstream from the second catalytic coating. It is thus possible to ascertain, among other things, properties of the exhaust gas and a corresponding operating state of the second catalytic coating. The introduction of an additional quantity of hydrocarbons according to the present invention may take place upstream from the first catalytic coating. However, it is also possible to introduce the additional quantity of hydrocarbons into the exhaust gas between the first and the second catalytic coating.

In general, it is understood that the meaning of "upstream from the second catalytic coating," where reasonable, may include the meaning "upstream from the first catalytic coating."

The first catalytic coating may be a diesel oxidation catalytic converter, and the second catalytic coating may be a diesel particle filter. The first catalytic coating in the diesel oxidation catalytic converter likewise has the capability of decreasing uncombusted hydrocarbons contained in the exhaust gas. A hydrocarbon fraction at the inlet of the diesel particle filter is thus generally too small to reliably assess the function of the second catalytic coating. However, the method according to the present invention is able to achieve this due to the fact that a large enough quantity of hydrocarbons is introduced into the exhaust gas that this quantity cannot be completely converted by the first catalytic coating; i.e., an additional quantity reliably arrives at the second catalytic coating, as explained in greater detail below.

In particular, it is provided that a state of the second catalytic coating is deduced from the ascertained property. The function of the second catalytic coating, i.e., of the diesel particle filter, may be checked or monitored comparatively easily, for example within the scope of so-called on-board diagnostics (OBD).

One embodiment of the present invention provides that the property is a difference in a quantity of heat (also "heat flow," unit energy per time) upstream and downstream from the second catalytic coating and/or a quantity of heat converted with the aid of the second catalytic coating. Thus, in the present case the property of the exhaust gas which is used for monitoring the second catalytic coating is the difference between the quantities of heat upstream and downstream from the second catalytic coating, i.e., the diesel particle filter. The converted quantity of heat may be ascertained based on a temperature difference upstream and downstream from the diesel particle filter, the ascertained temperature difference being converted into a difference in the quantities of heat by integration. This may be carried out with the aid of temperature sensors situated in the exhaust gas system which are comparatively robust and inexpensive. However, it is also possible to use a modeled value of the temperature downstream from the second catalytic coating for ascertaining the temperature difference. This temperature is ascertained under the assumption that no hydrocarbon is converted by the second catalytic coating. In the simplest case it is assumed that this ascertained temperature corresponds to the temperature upstream from the second catalytic coating. This has the advantage that an additional temperature sensor downstream from the second catalytic coating may be dispensed with.

Another embodiment of the present invention provides that the property is a change over time of an exhaust gas temperature downstream from the second catalytic coating. Since the introduction of an additional quantity of hydrocarbons into the exhaust gas flow takes place occasionally, the property of the exhaust gas or the state of the second catalytic coating may likewise be ascertained based on a change over time of the exhaust gas temperature downstream from the diesel particle filter, i.e., downstream from the second catalytic coating. It is particularly advantageous that this may be carried out using a single temperature sensor. It is understood that the two described embodiments of the method may also be combined, for example to increase the accuracy.

A further embodiment of the present invention provides that the property is a difference in a hydrocarbon fraction upstream and downstream from the second catalytic coating. The effect of the second catalytic coating with regard to the conversion of hydrocarbons may thus be easily ascertained directly and without using other variables.

A further embodiment of the present invention provides that the property is ascertained based on a difference in signals of lambda sensors upstream and downstream from the second catalytic coating. Lambda sensors may have a "cross sensitivity" with regard to a composition of the hydrocarbons (hydrocarbon chain length). When long-chained hydrocarbons are present, they may output a signal which indicates an apparently too lean mixture. Thus, if the lambda sensors upstream and downstream from the second catalytic coating output comparable signals, it may be deduced that no significant conversion of hydrocarbons is occurring in the diesel particle filter. Temperature sensors or hydrocarbon sensors are not necessary for this embodiment of the present invention, so that costs may be saved.

In addition, it may be provided that an exhaust gas temperature and/or a fraction of hydrocarbon upstream from the second catalytic coating is/are ascertained with the aid of a model. A hydrocarbon sensor or a temperature sensor upstream from the diesel particle filter may be saved in this way. The model ascertains the fraction of hydrocarbon or the exhaust gas temperature from other operating variables of the internal combustion engine or of the exhaust gas system, which are generally present anyway in a control and/or regulation device of the internal combustion engine or of the exhaust gas system.

The additional quantity of hydrocarbons may be introduced into the exhaust gas with the aid of at least one retarded post-injection into at least one combustion chamber of the internal combustion engine, and/or the additional quantity of hydrocarbons is introduced directly into the exhaust gas. Two particularly simple options for introducing additional quantities of hydrocarbons into the exhaust gas are thus described which require comparatively little, or even no, additional construction effort.

The method operates particularly accurately if the additional quantity of hydrocarbons is introduced into the exhaust gas, and/or if the property is ascertained, when a volume flow of the exhaust gas is greater than a threshold value and/or when an exhaust gas temperature is lower than a threshold value, and the second catalytic coating has a temperature that is higher than a threshold value. For the first case, that a volume flow of the exhaust gas is greater than a threshold value, a so-called HC slip takes place in the diesel oxidation catalytic converter, which is situated upstream from the diesel particle filter. Due to the comparatively large volume flow (exhaust gas mass flow), the diesel oxidation catalytic converter cannot convert all of the hydrocarbons provided to it. The method according to the present invention may be carried out particularly easily in this way.

Applying the method according to the present invention is likewise possible for the second case, that the exhaust gas temperature is lower than a threshold value and the second catalytic coating has a temperature that is higher than a threshold value. The present invention makes use of the finding that at low temperatures of the exhaust gas (lower than 180° C., for example), an introduction of hydrocarbons upstream from the diesel oxidation catalytic converter may at least partially reach the subsequent diesel particle filter, even at low space velocities of the exhaust gas. This is possible due to the fact that the hydrocarbon conversion of the first catalytic coating is likewise low due to the comparatively low exhaust gas temperature.

At the same time, however, it is necessary for the diesel particle filter to have a comparatively high temperature. Both preconditions necessary for this embodiment of the method are achievable in practice, since the diesel oxidation catalytic converter generally has a comparatively small mass or a small volume and therefore is able to cool more quickly than the diesel particle filter situated downstream. These preconditions may at least occasionally be met during operation of the internal combustion engine, in particular for a "dynamic" driving mode of the motor vehicle.

In addition, it may be provided that the additional quantity of hydrocarbons is introduced into the exhaust gas only when an oxygen fraction of the exhaust gas upstream from the second catalytic coating is greater than a threshold value, in particular that a lambda value of the exhaust gas is greater than one. As a result, sufficient oxygen is available for the combustion in the diesel particle filter. The method according to the present invention may thus be carried out with adequate precision. Care must be taken that the diesel oxidation catalytic converter or the first coating is not damaged by an excessively high exothermic reaction.

The method may be carried out particularly easily and accurately on a control and/or regulation device for an internal combustion engine or for an exhaust gas system. For this purpose, a computer program may be used which is appropriately programmed for carrying out the method.

Exemplary specific embodiments of the present invention are explained below with reference to the drawings.

DETAILED DESCRIPTION

Figure 1:
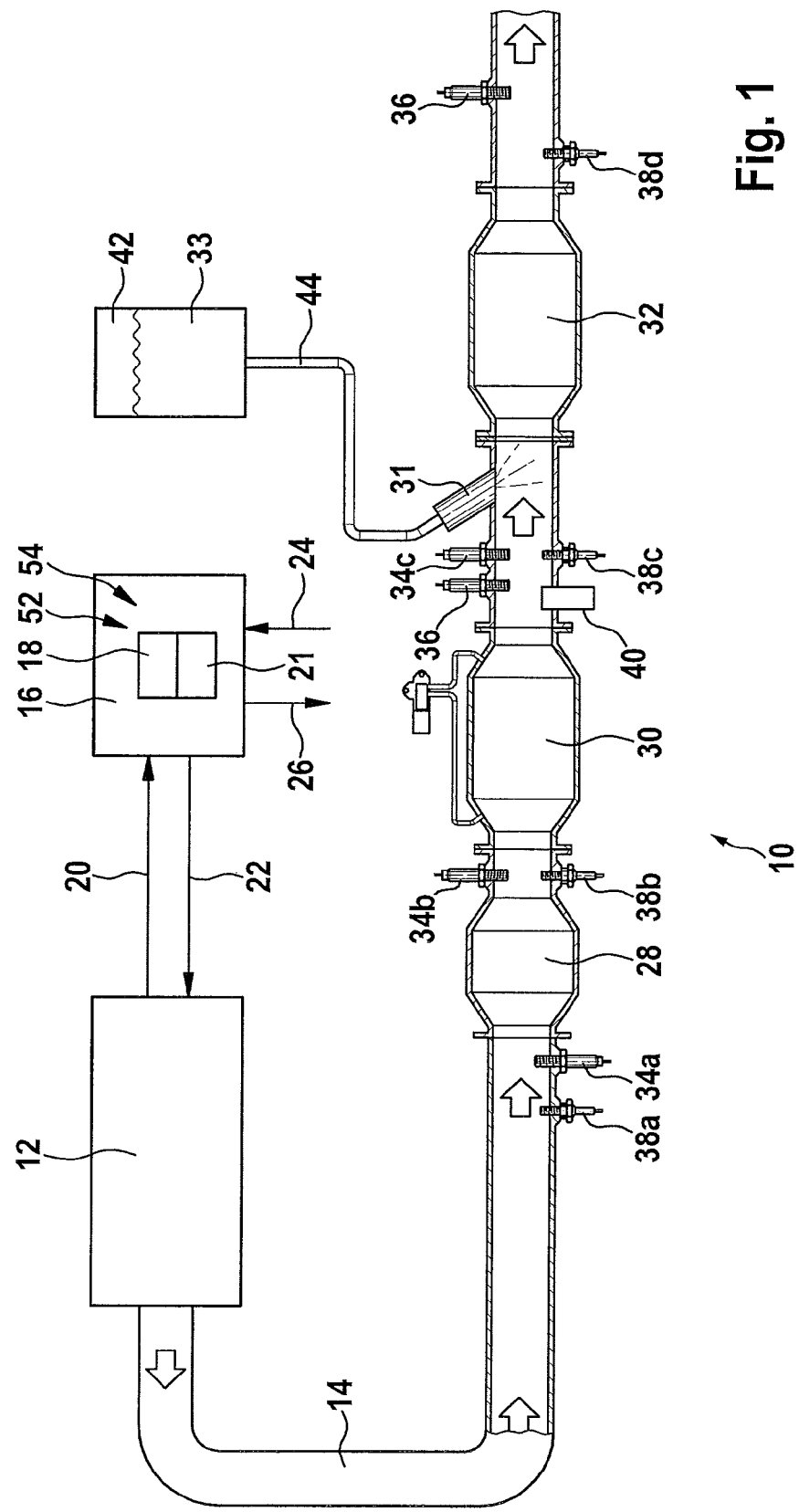
FIG. 1 shows a schematic illustration of an internal combustion engine and an exhaust gas system.

The same reference numerals are used for functionally equivalent elements and variables in all figures, even for different, specific embodiments.

FIG. 1 shows a simplified diagram of an exhaust gas system 10 of a motor vehicle in the lower area of the drawing. An internal combustion engine 12 from which exhaust gas flows into exhaust gas system 10 via a pipe connection 14 is symbolically illustrated at the left, above exhaust gas system 10. A control and/or regulation device 16 is connected to internal combustion engine 12 via incoming and outgoing electrical lines 20 and 22, respectively, and is connected to components of exhaust gas system 10 via incoming and outgoing electrical lines 24 and 26, respectively. These connections are merely indicated in the drawing. In addition, control and/or regulation device 16 includes a computer program 18 and one or multiple models 21. Computer program 18 may exchange data with model 21.

The exhaust gas is led through and processed in exhaust gas system 10 essentially from left to right. The present case involves the exhaust gas system 10 of a diesel motor vehicle. For this purpose, exhaust gas system 10 has a diesel oxidation catalytic converter 28, a diesel particle filter 30, a feed device 31 for an aqueous urea solution 33, and a selective catalytic reduction (SCR) catalytic converter 32 in the flow direction of the exhaust gas. Diesel oxidation catalytic converter 28 corresponds to a first catalytic coating, and diesel particle filter 30 corresponds to a second catalytic coating, of exhaust gas system 10.

In each case a lambda sensor 34a through 34c is situated in the exhaust gas flow, upstream from diesel oxidation catalytic converter 28 and upstream and downstream from diesel particle filter 30. One nitrogen oxides (NOx) sensor 36 each is situated in the exhaust gas flow upstream and downstream from SCR catalytic converter 32. In addition, in the present case exhaust gas system 10 has four temperature sensors 38a through 38d and a hydrocarbon (HC) sensor 40. Lambda sensors 34a through 34c, NOx sensors 36, temperature sensors 38a through 38d, and HC sensor 40 are connected to control and/or regulation device 16 via incoming and outgoing electrical lines 24 and 26, respectively. However, this is not individually illustrated in the drawing in FIG. 1.

It is noted that the sensors illustrated in the drawing in FIG. 1, i.e., lambda sensors 34a through 34c, NOx sensors 36, temperature sensors 38a through 38d, and HC sensor 40, are not necessarily simultaneously installed in exhaust gas system 10 in the numbers shown here. Rather, the drawing shows an aggregate of options for analyzing the exhaust gas and for monitoring the elements of exhaust gas system 10.

A storage container 42 which contains aqueous urea solution 33 and which is connected to feed device 31 via a hydraulic line 44 is situated in the upper right area in the drawing in FIG. 1.

Feed device 31 may be controlled and thus actuated via electrical lines 26. However, the introduction of aqueous urea solution 33 upstream from SCR catalytic converter 32 is not important for the method described below for monitoring the second catalytic coating.

During operation of exhaust gas system 10, hydrocarbon ($C_mH_n$, generally also referred to as "HC") fractions and carbon monoxide (CO) fractions of the exhaust gas are decreased in diesel oxidation catalytic converter 28. Soot particles are filtered from the exhaust gas in subsequent diesel particle filter 30, and uncombusted hydrocarbons contained in the exhaust gas are oxidized with the aid of the second catalytic coating. In addition, diesel oxidation catalytic converter 28 and diesel particle filter 30 allow a defined NO-to-NOx ratio to be provided in the exhaust gas, so that the NOx reduction of the exhaust gas may take place in an optimal manner in SCR catalytic converter 32 situated downstream.

For monitoring the second catalytic coating in diesel particle filter 30, a retarded post-injection 58 (see FIG. 3) occasionally or periodically occurs in internal combustion engine 12. Alternatively, a defined additional quantity of hydrocarbons may occasionally be directly introduced into the exhaust gas, for example upstream from diesel oxidation catalytic converter 28 or in an area between diesel oxidation catalytic converter 28 and diesel particle filter 30. The magnitude of the quantity is such that the first catalytic coating, i.e., in the present case, the diesel oxidation catalytic converter 28 is not able to convert it completely. This results in a so-called "HC slip" which may or should be subsequently oxidized with the aid of the second catalytic coating, a heat-generating reaction taking place in diesel particle filter 30.

At least one property of the exhaust gas which characterizes a reaction of the second catalytic coating due to the additionally introduced quantity of hydrocarbons is ascertained with the aid of at least one of the above-described sensors 34a through 34c, 36, 38a through 38d, and 40. An aim of the method is to deduce a state of the second catalytic coating and thus allow a prediction of the usability of the second catalytic coating, i.e., of diesel particle filter 30, with regard to the conversion of hydrocarbons.

The quantity of heat released during the reaction may be, ascertained using temperature sensor 38c downstream from diesel particle filter 30. This is achieved, for example, with the aid of a temperature reference value upstream from diesel particle filter 30 and a difference formation using an exhaust gas temperature 72 ascertained by temperature sensor 38c (see FIG. 5). The temperature reference value may be ascertained with the aid of temperature sensor 38b, or alternatively, with the aid of the, or a, model 21. In the latter case, for example a modeled value of the temperature downstream from second catalytic coating 30 is used for ascertaining the temperature difference. This temperature is ascertained under the assumption that no hydrocarbon is converted by second catalytic coating 30. It is then assumed that this ascertained temperature corresponds to the temperature upstream from second catalytic coating 30.

Based on the temperature difference formation, a difference in the quantities of heat (units: joules per second) may be ascertained as a function of an exhaust gas mass flow (volume flow 62, see FIG. 4) flowing through exhaust gas system 10. Based on this difference, the quantity of heat (units: joules or kilojoules) converted in diesel particle filter 30 or converted with the aid of the second catalytic coating may be subsequently ascertained by integration. The functionality of diesel particle filter 30, i.e., of the second catalytic coating, with regard to the conversion of hydrocarbons is generally better the greater the converted quantity of heat.

Alternatively, the quantity of heat converted with the aid of the second catalytic coating may be ascertained by evaluating a change over time (time derivative or formation of a gradient) of exhaust gas temperature 72 downstream from diesel particle filter 30. This is achieved, with the aid of temperature sensor 38c, in a temporal relationship with the introduction of the additional quantity of hydrocarbons.

The above-described method for monitoring the second catalytic coating in diesel particle filter 30 may be carried out when volume flow 62 of the exhaust gas or an exhaust gas velocity is greater than a threshold value. For high exhaust gas velocities, a dwell time of the exhaust gas in diesel oxidation catalytic converter 28 is comparatively short, so that the hydrocarbons contained in the exhaust gas cannot be completely converted there. This makes it possible to supply diesel particle filter 30 with a fraction of uncombusted hydrocarbons that is sufficiently high for the method.

If exhaust gas temperature 72 in exhaust gas system 10 (which is ascertained with the aid of temperature sensor 38a, for example) is lower than a predefined threshold value (lower than 180° C., for example), the fuel quantity introduced into the exhaust gas, directly or with the aid of the retarded post-injection, may still reach diesel particle filter 30, even for low volume flows, since the conversion of hydrocarbons in diesel oxidation catalytic converter 28 is comparatively low. This requires that at the same time, the second catalytic coating, i.e., diesel particle filter 30, has a temperature that is higher than a predefined threshold value (so-called "light-off" temperature, in the present case for a hydrocarbon conversion of at least 50 percent), so that a sufficiently strong reaction may take place in diesel particle filter 30. These prerequisites may be present, for example, during a "dynamic" operation of internal combustion engine 12 or of the motor vehicle, provided that diesel oxidation catalytic converter 28 cools more quickly than diesel particle filter 30. This is additionally facilitated when diesel oxidation catalytic converter 28 has a smaller volume or a smaller mass than diesel particle filter 30.

The above-described method for monitoring the second catalytic coating in diesel particle filter 30 may be carried out when an oxygen fraction of the exhaust gas upstream from the second catalytic coating is greater than a threshold value, in particular when a lambda value of the exhaust gas is greater than one. In this regard it is important that the first catalytic coating in diesel oxidation catalytic converter 28 is not damaged by an excessively high exothermic reaction.

In one alternative specific embodiment of the method, a fraction of hydrocarbon in the exhaust gas upstream from diesel particle filter 30 is ascertained with the aid of a model 21 and subsequently used as a reference value. This reference value is compared to a measured value of HC sensor 40. Based on the two values, a conversion of hydrocarbons in diesel particle filter 30 is ascertained by difference formation, so that a state of the second catalytic coating may likewise be deduced.

In another alternative specific embodiment of the method, in particular lambda sensors 34b and 34c are used for monitoring the second catalytic coating. In the present case, lambda sensors 34b and 34c have a "cross sensitivity" with regard to a composition of the hydrocarbons (hydrocarbon chain length). When long-chained hydrocarbons are present, lambda sensors 34b and 34c may output a signal which indicates an apparently too lean mixture. Thus, if both lambda sensors 34b and 34c output comparable signals, it may be deduced that no significant conversion of hydrocarbons is occurring in diesel particle filter 30. Conversely, if lambda sensors 34b and 34c output different signals, it may be deduced that conversion of hydrocarbons is occurring. These differences may also allow a quantitative assessment.

Figure 2:
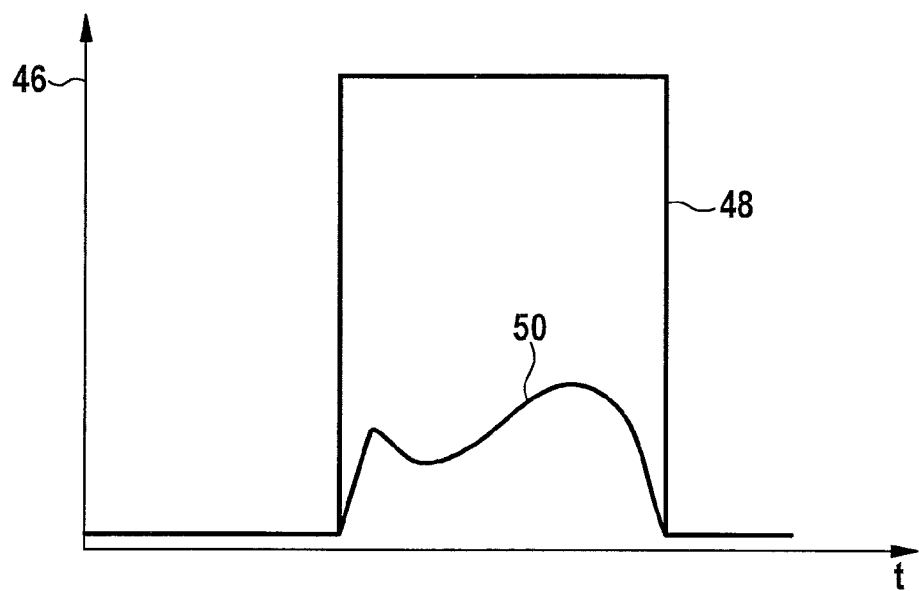
FIG. 2 shows a time diagram having two curves of a hydrocarbon concentration.

FIG. 2 shows a time diagram with time t plotted on the abscissa and a hydrocarbon fraction 46 in the exhaust gas of exhaust gas system 10 plotted on the ordinate. A first curve 48 is illustrated which characterizes the occasional introduction of an additional quantity of hydrocarbons, for example 10 grams in 15 seconds, corresponding to an HC concentration of approximately 10,000 parts per million (ppm) in the exhaust gas upstream from diesel oxidation catalytic converter 28. In addition, a second curve 50 is plotted which characterizes hydrocarbon fraction 46 downstream from diesel oxidation catalytic converter 28. In the present case, second curve 50 corresponds to an average HC concentration of approximately 2,000 ppm during a measuring interval of 15 seconds.

For a time range not indicated in greater detail in the drawing in FIG. 2, curve 48 shows that the additional quantity of hydrocarbons is introduced into the exhaust gas in packages, so to speak. In relation to first curve 48, second curve 50 has a greatly reduced amplitude and a changed time curve. However, it is apparent that the quantity of hydrocarbons downstream from diesel oxidation catalytic converter 28, characterized by second curve 50, is comparatively large in order to bring about a sufficient heat-generating reaction in diesel particle filter 30. For a better comparison, the two curves in FIG. 2 are shown superimposed with respect to time. It is understood that second curve 50 is produced with a certain time offset with respect to first curve 48 which is conditional upon the configuration of diesel oxidation catalytic converter 28 as well as upon the particular volume flow of the exhaust gas.

Figure 3:
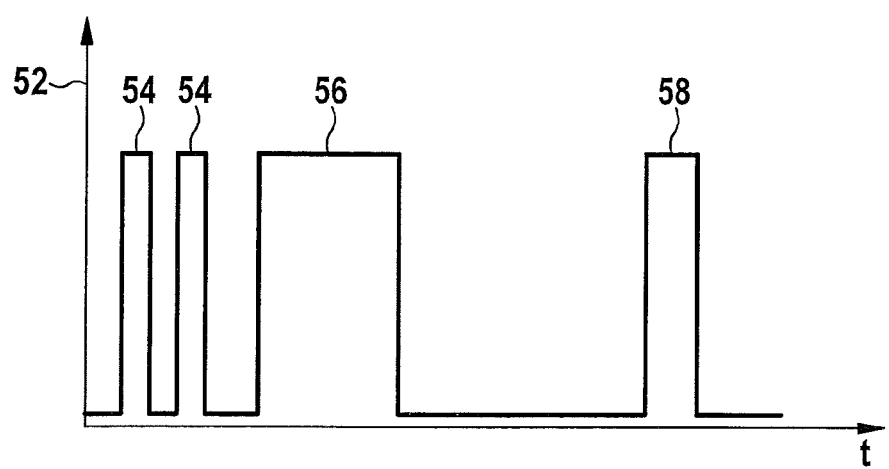
FIG. 3 shows a time diagram having an injection pattern of a fuel injection.

FIG. 3 shows a time diagram which characterizes a fuel quantity 52 that is injected into one or multiple combustion chambers of internal combustion engine 12. In the present case, the fuel injection pattern on which the drawing in FIG. 3 is based has two pre-injections 54, a main injection 56, and a post-injection 58.

The timing of the two pre-injections 54 and of main injection 56 is selected in such a way that the pre-injections and the main injection make a contribution to a torque during the working cycle of internal combustion engine 12, and thus are essentially completely combusted. However, the fuel injected by ("retarded") post-injection 58 is not combustible, or is only partially combustible, by internal combustion engine 12. For example, the fuel quantity injected in post-injection 58 is 10 milligrams per working stroke of internal combustion engine 12. As a result, uncombusted hydrocarbons are discharged into the exhaust gas by internal combustion engine 12 during the exhaust stroke of a particular cylinder, and thus flow into exhaust gas system 10. Post-injection 58 is thus used to occasionally introduce an additional quantity of hydrocarbons into the exhaust gas upstream from the first catalytic coating. The partial injections illustrated in FIG. 3 are each approximated by a rectangular shape for the sake of simplicity.

Figure 4:
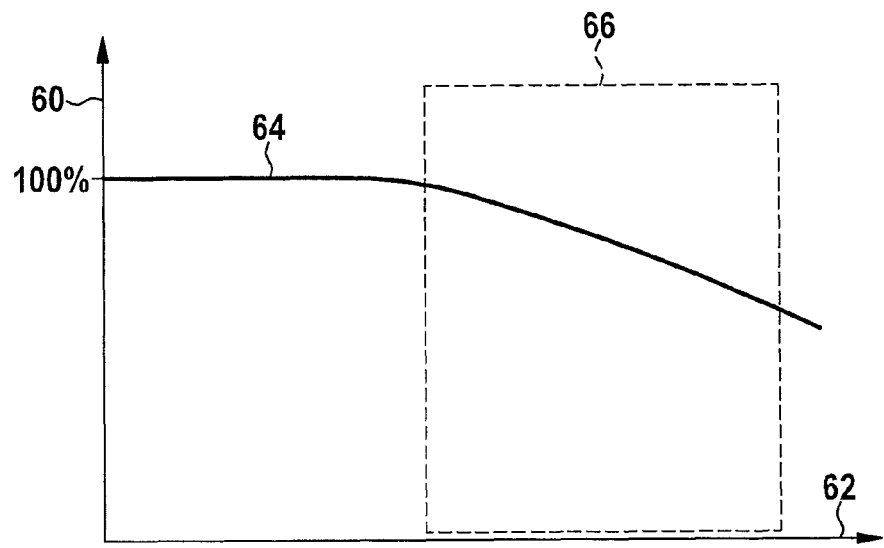
FIG. 4 shows a diagram with a slip of hydrocarbons in the exhaust gas as a function of an exhaust gas velocity.

FIG. 4 shows a conversion rate 60 of hydrocarbons in diesel oxidation catalytic converter 28 as a function of a volume flow 62 in diesel oxidation catalytic converter 28. The arrows of the axes illustrated in the drawing point in the direction of a high conversion rate 60 and a high exhaust gas velocity or volume flow 62, respectively. For low volume flows 62, illustrated curve 64 has a conversion rate 60 of approximately 100 percent. With increasing volume flow (exhaust gas velocity, exhaust gas mass flow), curve 64 passes through an area 66 in which conversion rate 60 becomes monotonically less than 100 percent. Area 66 thus indicates a slip of hydrocarbons (HC slip) upon passing through diesel oxidation catalytic converter 28.

It is apparent that for small volume flows, conversion rate 60 is approximately 100 percent, which means that the exhaust gas downstream from diesel oxidation catalytic converter 28 has no significant fractions of hydrocarbons. Accordingly, the left area of the diagram in the drawing is generally not suitable for the described method. However, as already described above for FIG. 1, it is possible to use the left area in the drawing for the method if a temperature of diesel oxidation catalytic converter 28 is below a predetermined threshold value, and at the same time a temperature of diesel particle filter 30 is above a predefined threshold value.

Figure 5:
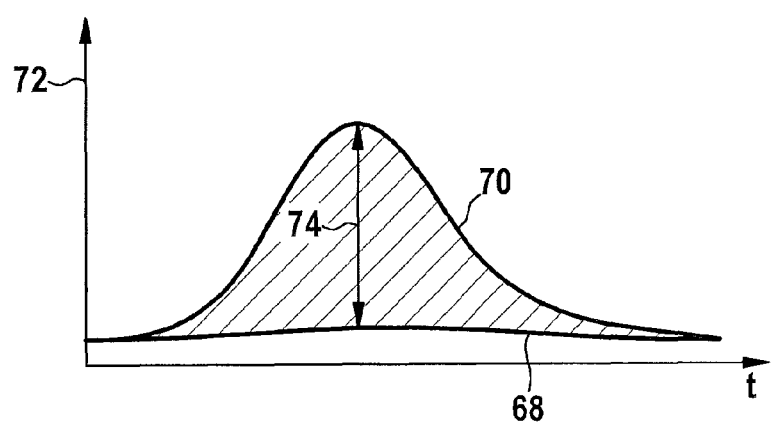
FIG. 5 shows a time diagram having two curves of an exhaust gas temperature.

FIG. 5 shows a time diagram having two curves 68 and 70 of an exhaust gas temperature 72 downstream from diesel particle filter 30. In the present case, exhaust gas temperature 72 is ascertained with the aid of temperature sensor 38c.

Curve 68 corresponds to a time curve of exhaust gas temperature 72 when diesel particle filter 30 has no (functional) second catalytic coating. Curve 68 has been ascertained with the aid of a model 21. Second curve 70 shows a time curve of exhaust gas temperature 72 which results at the location of temperature sensor 38c when diesel particle filter 30 has a functional second catalytic coating. An arrow 74 denotes a difference between maximum exhaust gas temperatures 72 present for the particular curves 68 and 70. For example, this difference is approximately 50° K. A time integral ascertained over each of curves 68 and 70 and a subsequent difference formation carried out for these time integrals results in a quantity of heat of approximately 150 kJ.

It is apparent that the ascertainment of the time curve of exhaust gas temperature 72, illustrated in FIG. 5, as a result of the occasional introduction, illustrated in FIG. 2, of an additional quantity of hydrocarbons corresponding to first curve 48 is suitable for deducing a state of the second catalytic coating in diesel particle filter 30.

Figure 6:
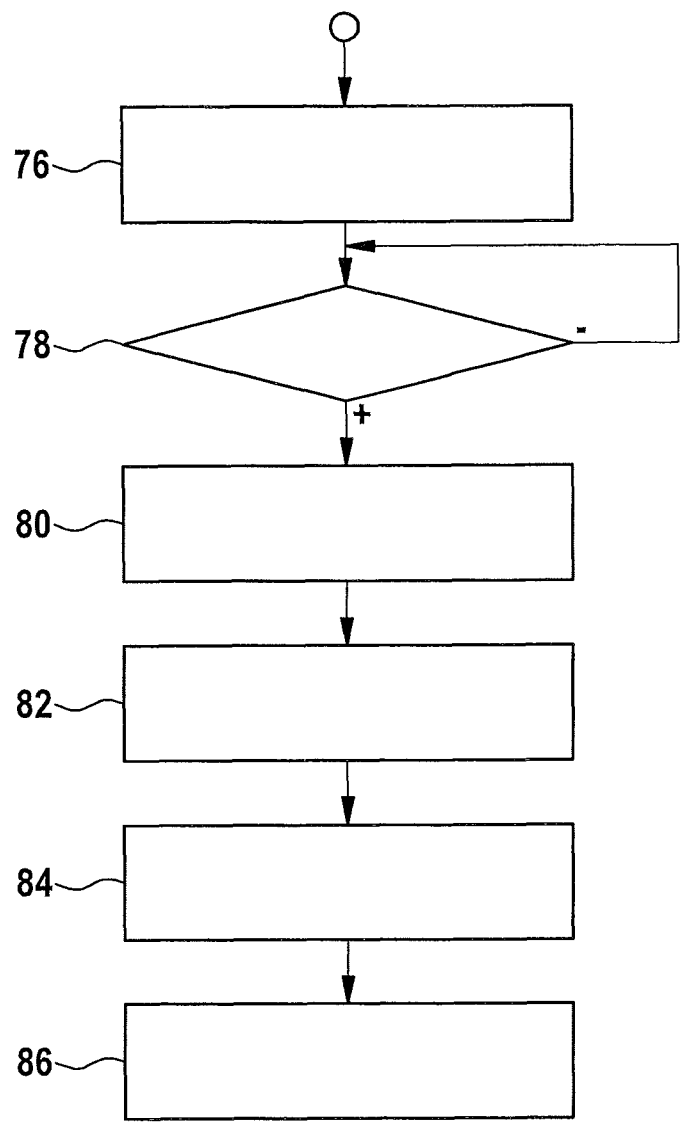
FIG. 6 shows a flow chart for carrying out a method for operating the exhaust gas system.

FIG. 6 shows a flow chart for carrying out the method. The procedure illustrated in FIG. 6 begins in a start block 76. A check is made in a subsequent query block 78 as to whether suitable conditions are present for carrying out the method.

These conditions have already been described above, and concern volume flow 62 of the exhaust gas, and exhaust gas temperature 72 in diesel oxidation catalytic converter 28 and in diesel particle filter 30. An oxygen fraction of the exhaust gas upstream from the second catalytic coating, which may be ascertained using lambda sensors 34a and 34b, is also important.

If suitable conditions for the method are not present, the method branches back to the input of query block 78. Otherwise, the method branches to a subsequent block 80.

Various operating variables of internal combustion engine 12 and of exhaust gas system 10 are ascertained in block 80, in particular using the sensors illustrated in FIG. 1. An additional quantity of hydrocarbons is introduced for a certain time period into the exhaust gas upstream from diesel oxidation catalytic converter 28 in a subsequent block 82, as likewise already described above.

A temperature increase resulting from the heat-generating reaction in diesel particle filter 30 is ascertained, temporally integrated, and compared to a reference value in a subsequent block 84. On this basis a state of the second catalytic coating may be deduced. The second catalytic coating in diesel particle filter 30 generally has a higher functionality the greater the temperature increase downstream from diesel particle filter 30, and based on the magnitude of the time integral that is formed. Alternatively, other specific embodiments of the method described above may be carried out in block 84. The procedure illustrated in FIG. 6 terminates in a subsequent end block 86.

What is claimed is:

1. A method for operating an exhaust gas system for an internal combustion engine, the method comprising:
 occasionally introducing an additional quantity of hydrocarbons into the exhaust gas, of an exhaust gas system, upstream from at least one first catalytic coating so that a heat-generating reaction can occur in the second catalytic coating, wherein the exhaust gas system includes the at least one first catalytic coating and at least one second catalytic coating, the second catalytic coating being situated in the exhaust gas flow downstream from the first catalytic coating; and
 ascertaining, with the aid of at least one of (i) at least one temperature sensor, (ii) at least one hydrocarbon sensor, (iii) at least one lambda sensor upstream and/or downstream from the second catalytic coating, at least one property of the exhaust gas which characterizes a reaction of the second catalytic coating due to the additional quantity of hydrocarbons, wherein the property is ascertained:
 when a volume flow of the exhaust gas is greater than a threshold value; and/or
 when an exhaust gas temperature is lower than a threshold value, and the second catalytic coating has a temperature that is higher than a threshold value.

2. The method of claim 1, wherein the first catalytic coating is a diesel oxidation catalytic converter and the second catalytic coating is in a diesel particle filter.

3. The method of claim 1, wherein a state of the second catalytic coating is deduced from the ascertained property.

4. The method of claim 1, wherein the property is a difference in a quantity of heat upstream and downstream from the second catalytic coating and/or a quantity of heat converted with the aid of the second catalytic coating.

5. The method of claim 1, wherein the property is a change over time of an exhaust gas temperature downstream from the second catalytic coating.

6. The method of claim 1, wherein the property is a difference in a hydrocarbon fraction upstream and downstream from the second catalytic coating.

7. The method of claim 1, wherein the property is ascertained based on a difference in signals of lambda sensors upstream and downstream from the second catalytic coating.

8. The method of claim 1, wherein an exhaust gas temperature and/or a hydrocarbon fraction upstream from the second catalytic coating is ascertained with the aid of a model.

9. The method of claim 8, wherein a temperature downstream from the second catalytic coating is ascertained based on a model and under the assumption that no hydrocarbon is converted by the second catalytic coating, and wherein the ascertained temperature is used as the exhaust gas temperature upstream from the second catalytic coating.

10. The method of claim 1, wherein the additional quantity of hydrocarbons is introduced into the exhaust gas with the aid of at least one retarded post-injection into at least one combustion chamber of the internal combustion engine, and/or the additional quantity of hydrocarbons is introduced directly into the exhaust gas.

11. The method of claim 1, wherein the additional quantity of hydrocarbons is introduced into the exhaust gas only when an oxygen fraction of the exhaust gas upstream from the second catalytic coating is greater than a threshold value, wherein a lambda value of the exhaust gas is greater than one.

12. A control/regulation device for an internal combustion engine or for an exhaust gas system for operating an exhaust gas system for an internal combustion engine, comprising:
 a control/regulation arrangement configured to perform the following:
 occasionally introducing an additional quantity of hydrocarbons into the exhaust gas, of an exhaust gas system, upstream from at least one first catalytic coating so that a heat-generating reaction can occur in the second catalytic coating, wherein the exhaust gas system includes the at least one first catalytic coating and at least one second catalytic coating, the second catalytic coating being situated in the exhaust gas flow downstream from the first catalytic coating; and ascertaining, with the aid of at least one of (i) at least one temperature sensor, (ii) at least one hydrocarbon sensor, (iii) at least one lambda sensor upstream and/or downstream from the second catalytic coating, at least one property of the exhaust gas which characterizes a reaction of the second catalytic coating due to the additional quantity of hydrocarbons, wherein the property is ascertained:

when a volume flow of the exhaust gas is greater than a threshold value; and/or when an exhaust gas temperature is lower than a threshold value, and the second catalytic coating has a temperature that is higher than a threshold value.

13. A computer readable medium having a computer program, which is executable by a processor, comprising:

a program code arrangement having program code for operating an exhaust gas system for an internal combustion engine, by performing the following:

occasionally introducing an additional quantity of hydrocarbons into the exhaust gas, of an exhaust gas system, upstream from at least one first catalytic coating so that a heat-generating reaction can occur in the second catalytic coating, wherein the exhaust gas system includes the at least one first catalytic coating and at least one second catalytic coating, the second catalytic coating being situated in the exhaust gas flow downstream from the first catalytic coating; and ascertaining, with the aid of at least one of (i) at least one temperature sensor, (ii) at least one hydrocarbon sensor, (iii) at least one lambda sensor upstream and/or downstream from the second catalytic coating, at least one property of the exhaust gas which characterizes a reaction of the second catalytic coating due to the additional quantity of hydrocarbons, wherein the property is ascertained:

when a volume flow of the exhaust gas is greater than a threshold value; and/or when an exhaust gas temperature is lower than a threshold value, and the second catalytic coating has a temperature that is higher than a threshold value.

\* \* \* \* \*